United States Patent
Bogdan

[11] Patent Number: 5,515,261
[45] Date of Patent: May 7, 1996

[54] POWER FACTOR CORRECTION CIRCUITRY

[75] Inventor: Alexei Bogdan, North York, Canada

[73] Assignee: Lumion Corporation, Toronto, Canada

[21] Appl. No.: 360,546

[22] Filed: Dec. 21, 1994

[51] Int. Cl.⁶ .................... H02M 7/217; G05F 1/70
[52] U.S. Cl. .................. 363/89; 363/46; 323/222
[58] Field of Search ................ 363/89, 24, 44–46; 323/222, 229, 131, 132, 45–46

[56] References Cited

U.S. PATENT DOCUMENTS

| | | | |
|---|---|---|---|
| 4,045,719 | 8/1977 | Salzer | 363/89 |
| 4,277,726 | 7/1981 | Burke | 315/98 |
| 4,572,990 | 2/1988 | Leale et al. | 315/220 |
| 4,672,522 | 6/1987 | Lesea | 363/48 |
| 4,716,342 | 12/1987 | McCaffrey | 315/219 |
| 4,937,505 | 6/1990 | Déglon et al. | 315/307 |
| 4,985,664 | 1/1991 | Nilssen | 315/209 |
| 5,001,400 | 3/1991 | Nilssen | 315/209 |
| 5,038,266 | 8/1991 | Callen et al. | 363/89 |
| 5,039,920 | 8/1991 | Zonis | 315/219 |
| 5,068,574 | 11/1991 | Koda et al. | 315/225 |
| 5,099,407 | 9/1992 | Thorne | 363/37 |
| 5,105,127 | 4/1992 | Lavaud et al. | 315/291 |
| 5,111,114 | 5/1992 | Wang | 315/225 |
| 5,117,161 | 5/1992 | Avrahami | 315/226 |
| 5,166,578 | 11/1992 | Nilssen | 315/209 |
| 5,177,409 | 1/1993 | Nilssen | 315/293 |
| 5,185,560 | 2/1993 | Nilssen | 315/219 |
| 5,191,263 | 3/1993 | Konopka | 315/209 |
| 5,192,897 | 3/1993 | Vossough et al. | 315/308 |

Primary Examiner—Peter S. Wong
Assistant Examiner—Aditya Krishnan
Attorney, Agent, or Firm—Bereskin & Parr

[57] ABSTRACT

A power factor correction circuit for use with a power supply. The power supply has an input for receiving an AC input signal, a rectifier for producing a rectified AC signal and an output stage for outputting a DC output signal for driving a load coupled to the output stage. The power factor correction circuit comprises an input port coupled to the rectifier for receiving the rectified AC signal; and an inductor coupled to the input port for storing energy in response to excitation by the rectified AC signal. The excitation of the inductor is controlled through the opening and closing of a switch by a controller. A capacitor is coupled to the inductor and charged by the energy stored in the inductor when the switch is opened to produce the DC output signal. The power factor correction circuit includes a diode for blocking the charge path between the input port and the capacitor and also allowing the controller to boost the charge level on the capacitor.

20 Claims, 7 Drawing Sheets

POWER FACTOR CORRECTION CIRCUITRY

FIELD OF THE INVENTION

This invention relates to power factor correction circuits, and more particularly to power factor correction circuits for switch mode power supplies and electronic ballasts.

BACKGROUND OF THE INVENTION

The demand and development of power factor correction circuitry has been fuelled by concern over the massive use of electronic power conversion, i.e. AC to DC power supplies, and the resulting potential for contamination of AC power lines.

Power factor is defined as the ratio of the actual power (Watts) developed by an AC power system to the apparent power (i.e. volt-amperes).

Most electronic ballast and switching power supplies use a bridge rectifier and a bulk storage capacitor to derive raw DC voltage from the AC power line. Such a circuit draws power from the AC line when the instantaneous AC voltage exceeds the capacitor voltage. This occurs near the line voltage peak and results in a high charge current spike. Since power is only taken near the line voltage peaks, the resulting spikes of current are extremely non-sinusoidal and have a high harmonic content. The result is a power supply with a poor power factor where the apparent input power is much higher than the real power. The power factor (i.e. ratio of actual power developed to the apparent power) is typically in the range 0.5 to 0.7. In response, International Standards are being established to control this type of harmonic loading on power systems, for example, IEC Standard 555.2 defines the maximum levels of harmonic content a device can draw from an AC power line.

To achieve a high power factor, e.g. in the range of 0.99, the current which is drawn should have a sinusoidal wave shape and the sinusoidal current should not be more than a few degrees out of phase with the sinusoidal waveform for an AC voltage supply. Power factor correction circuits according to the art fall into two broad groups: passive and active. The passive power factor correction circuits usually contain a combination of large capacitors, inductors and rectifiers that operate at the frequency of the AC power line to provide a resonant circuit which produces a sinusoidal current waveform. While passive power factor correction circuits can produce a high power factor, they are not very efficient. Active power factor correction circuits, on the other hand, incorporate some form of high frequency switching converter for power processing of the voltage and current waveforms. They typically utilize microchip technology to control operation of the power supply circuit and produce a current waveform with a sinusoidal shape. A popular topology is the "boost converter" which will be familiar to those skilled the art. Since active power factor circuits operate at a frequency which is much higher than the AC power line, the circuits can be smaller, lighter in weight, and more efficient than a passive circuit.

While known power factor correction circuits have provided elegant solutions to the problem of power factor control by keeping the current drawn from the AC power line sinusoidal and "in-phase" with the line voltage, known power correction circuits still possess less than ideal characteristics. One shortcoming common to most power factor correction circuits is the presence of a current path in the switch-off state which in practical terms means that the load will be "live" or connected to the full wave rectified AC voltage requiring care and caution for testing and maintenance operations, e.g. the use of isolation transformers. This problem has been addressed in the prior art by including elaborate protection circuitry for the output stage. Another problem associated with known power factor correction circuits arises from the requirement that the voltage on the bulk capacitor must be greater than the input line voltage, i.e. $V_{CAP} \geq 1.2 \sqrt{2} V_{INPUT}$ to provide the capability to maintain a sinusoidal wave-shape for the current. In practical terms, this makes it next to impossible to provide a compact electronic ballast system for a high voltage application, e.g. >347 volts. Another shortcoming of known power factor correction systems concerns the bulk capacitor. Because there is an off-state current or charge path, the bulk capacitor must be able to handle the voltage $1.2 \sqrt{2} V_{INPUT}$, which means that the capacitor will have a fairly high value, i.e. in micro-Farad range. Capacitors in this range are typically large in size and comprise electrolytic dielectrics. The large size of the capacitor limits the output capacity of the power supply and also makes it difficult to miniaturize the power circuit, and therefore applications such as laptop and notebook computers and line powered personal digital assistants (PDA's) are limited. Furthermore, it is not desirable to use electrolytic capacitors because of their unreliable nature as will be understood by those skilled in the art. For example, electrolytic capacitors, and specifically the dielectric layer, are prone to breakdown over time and susceptible to environmental factors such as humidity and heat.

The maximum performance for power supplies using existing power factor correction circuitry (i.e. electrolytic capacitors) is typically 30 Watts/in$^3$. This makes it impractical to use such power supplies, e.g. switching power supplies, for applications such as laptop computers, or other electronic devices where size and weight are important.

Furthermore, the maximum power levels for known power factor correction circuits are typically in the range 400 Watts, which as will be understood by one skilled in the art makes these circuits unsuitable for high voltage or high power applications, for example, electronic ballast supplies for High Intensity Discharge ("HID") lamps.

Electronic ballast circuits are power supplies which are designed for fluorescent, high intensity discharge, halogen, etc. lighting systems. The application of known power factor correction circuits, e.g. boost converters, to electronic ballast circuits is limited because of the requirements for a high output voltage or "start voltage" to initiate the discharge and then a low output voltage or "running voltage" to maintain the discharge.

Accordingly, there is a need for power factor correction circuits which overcome the shortcomings of PFC circuits known in the art.

BRIEF SUMMARY OF THE INVENTION

In a first aspect, the present invention provides a power factor correction circuit for use with a power supply having an input port for receiving an AC input signal and a rectifier for producing a rectified AC signal and an output stage for outputting a DC output signal for driving a load coupled to the output stage, said power factor correction circuit comprising: (a) an input coupled to the rectifier for receiving the rectified AC signal; (b) energy storage means coupled to said input for storing energy in response to excitation by the rectified AC signal; (c) controller means for controlling excitation of said energy storage means; (d) charge storage means coupled to said energy storage means for charging by said energy storage means under control of said controller means to produce the DC output signal; and (e) blocking means for blocking a direct path between said input and the load.

In a second aspect, the present invention provides a power factor correction circuit for use with a power supply having an input port for receiving an AC input signal and a rectifier for producing a rectified AC signal and an output stage for outputting a DC output signal for driving a load coupled to the output stage, said power factor correction circuit comprising: (a) an input coupled to the rectifier for receiving the rectified AC signal; (b) charge storage means having first and second terminals, the first terminal being connected to said input and said connection forming a first output terminal and said second terminal forming a second output terminal for connecting the load; (c) energy storage means for storing energy in response to excitation by the rectified AC signal, said energy storage means having first and second terminals, the first terminal of said energy storage means being connected to said second output terminal; (d) means for isolating said energy storage means from said input port, said means for isolating being connected to said input and to the second terminal of said energy storage means; and (c) controller means coupled to the second terminal of said energy storage means for controlling excitation of said energy storage means by providing a controllable charge path through the load for the rectified AC signal to excite said energy storage means and the load providing means for damping the rectified AC signal fed to said energy storage means.

In a third aspect, the present invention provides a electronic ballast power supply for converting an AC input signal into a DC output signal suitable for powering a lamp, said electronic ballast power supply comprising: (a) an input port for receiving the AC input signal; (b) a rectifier coupled to said input port and having means for rectifying the AC input signal to produce a rectified AC signal at an output; (c) a power factor correction circuit having an coupled to said rectifier output for receiving said rectified AC input signal, said power factor correction circuit including, (i) energy storage means coupled to said input for storing energy in response to excitation by the rectified AC signal; (ii) controller means for controlling excitation of said energy storage means; (iii) charge storage means coupled to said energy storage means for charging by said energy storage means under control of said controller means to produce the DC output signal; and (iv) blocking means for blocking a direct path between said input and the load.

In an another aspect, the present invention provides a power factor correction circuit for use with a power supply having a supply input port for receiving an AC input signal and a rectifier for producing a rectified AC signal and an output stage for outputting a DC output signal for driving a load coupled to the output stage, said power factor correction circuit comprising: (a) an input coupled to the rectifier for receiving the rectified AC signal; (b) a booster stage coupled to said input and having a booster output port and means for producing a boosted signal from the rectified AC signal at said booster output port; (c) a reducer stage coupled to said booster output port and having means for generating the DC output signal from said boosted signal; (d) controller means coupled to said booster stage and to said reducer stage for controlling operation of said booster and reducer stages; and (e) said controller means including power factor correction means.

BRIEF DESCRIPTION OF THE DRAWINGS

For a better understanding of the present invention, and to show more clearly how it may be carried into effect, reference will now be made, by way of example, to preferred embodiments of the present invention shown the accompanying drawings in which.

DETAILED DESCRIPTION OF THE PREFERRED EMBODIMENTS

Figure 1:
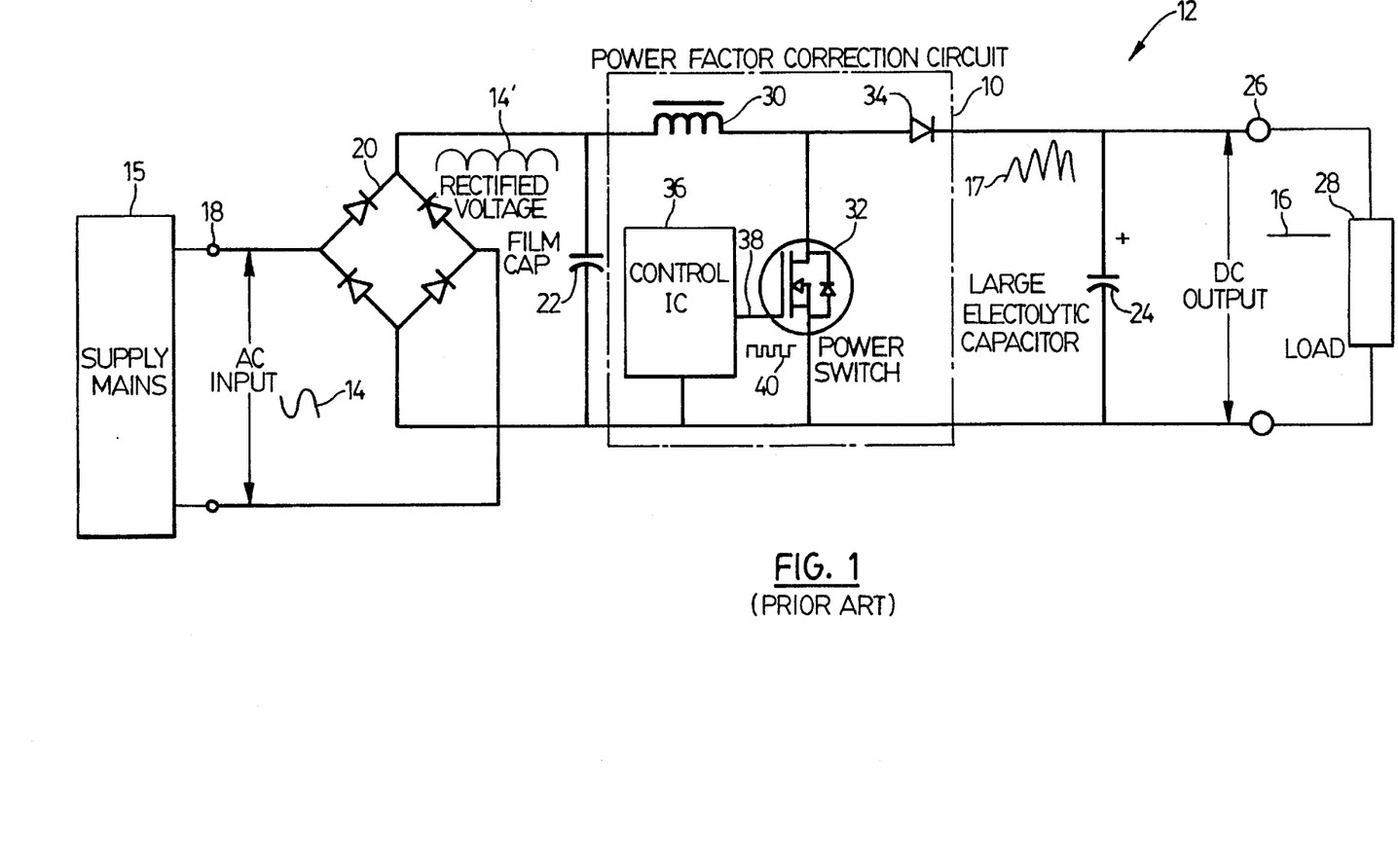
FIG. 1 shows in diagrammatic form a power factor correction circuit according to the prior art.

Reference is first made to FIG. 1 which shows in diagrammatic form a power factor correction circuit according to the prior art. In FIG. 1, the power factor correction circuit or PFC circuit is denoted by reference 10. The PFC circuit 10 is part of an "off-line" power supply circuit indicated generally by reference 12. The power supply 12 converts an AC voltage signal 14 from supply mains 15 into a DC voltage signal 16.

As shown in FIG. 1, the power supply 12 has an input 18 which couples the AC voltage signal 14 (and the supply mains 15) to a full-wave rectifier 20. The output of the full-wave rectifier 20, i.e. rectified AC voltage signal 14', is coupled to a capacitor 22. The function of the capacitor 22 is to provide a DC offset to the rectified AC signal 14', thereby keeping the rectified AC signal 14' above zero. The PFC circuit 12 is coupled between the capacitor 22 and an output or "bulk" capacitor 24. The output capacitor 24 for typical applications comprises a large electrolytic capacitor, typically in the micro-Farad range and up. The output capacitor 24 produces the constant DC voltage output signal 16 at an output port 26. The output port 26 couples to a load 28.

The PFC circuit 10 comprises an inductor 30, a power switch 32, a switch or diode 34 and a controller 36. One terminal of the inductor 30 connects to the capacitor 22 and the other terminal of the inductor 30 connects to the switch 32. The inductor 30 also connects to the anode of the diode 34. As shown in FIG. 1, the power switch 32 has a control terminal 38 which is coupled to the controller 36. The controller 36 uses the terminal 38 to control the state of the switch 32, i.e. on or off. When the switch 32 is on, the inductor 30 stores energy and when the switch 32 is off, the energy in the inductor 30 discharges into the load 28 through the diode 34. During the discharge period, the voltage across the inductor 30 adds to the voltage on the output capacitor 24. The capacitor 24 also smooths the output voltage signal 16 to provide a constant DC output. According to the art, the controller 38 produces a pulse width modulated (PWM) signal 40 which controls the switch 32 via the terminal 38 so that a charging current (i.e. inductor current) having an average value which is sinusoidal in shape is produced for charging the bulk capacitor 24. It is well-known that shaping the charging current 17 (shown in FIG. 2(b)) as a sinusoidal signal which is not more than a few degrees out of phase with the sinusoidal voltage signal 14 results in a power factor which approaches unity, i.e. 0.99. The charging or inductor current 17 and the PWM control signal 40 are shown in detail in FIG. 2(b).

The controller 38 can comprise any one of a number of commercially available microchips, such as the Motorola MC34262 power factor controller, the LT1249 power factor controller from Linear Technology, or the HV-2405E power factor controller available from Harris Semiconductor Corporation. The implementation of the controller 38 is within the understanding of one skilled in the art.

Referring still to FIG. 1, the switch 34 in the PFC circuit 10 typically comprises a diode. The diode 34 acts as a uni-directional switch. When the diode 34 is forward biased (and the switch 32 is open), the inductor current 17 will charge the capacitor 24 to an output voltage level. The diode 34, however, prevents the capacitor 24 from discharging through the switch 32 (if closed) or through the inductor 30. This allows the capacitor 24 to be charged or "boosted" to a value which is higher than the AC input voltage 14.

Figure 2A:
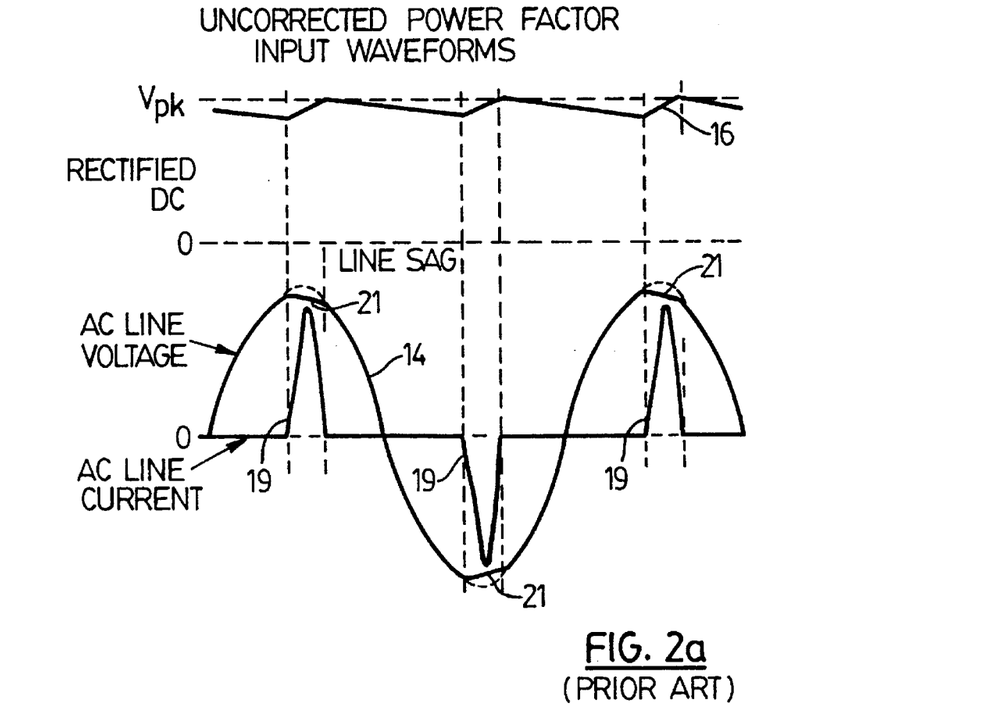
FIG. 2(a) shows in diagrammatic form voltage and current waveforms for a prior art circuit which does not have power factor correction.

Reference is next made to FIG. 2(a) which shows the effect if the power factor is uncorrected. As shown in FIG. 2(a), the AC input voltage signal 14 is a sinusoidal signal and the DC output voltage 16 is a relatively constant signal with some rippling. In response to the charging of the output capacitor 24, an AC input line current 19 is drawn by the power supply 12 from the supply mains 15. As shown in FIG. 2(a), the AC input line current 19 is highly non-sinusoidal and comprises a series of pulses. The pulses in the AC input line current 19 coincide with the positive and negative peaks in the AC input voltage 14 and represent high charge current spikes which can cause the AC line voltage 14 to "sag" as indicated by reference 21. Because of the highly non-sinusoidal nature of the line current 19, the power factor for uncorrected power supply is typically low and in the range 0.58 to 0.62.

Figure 2B:
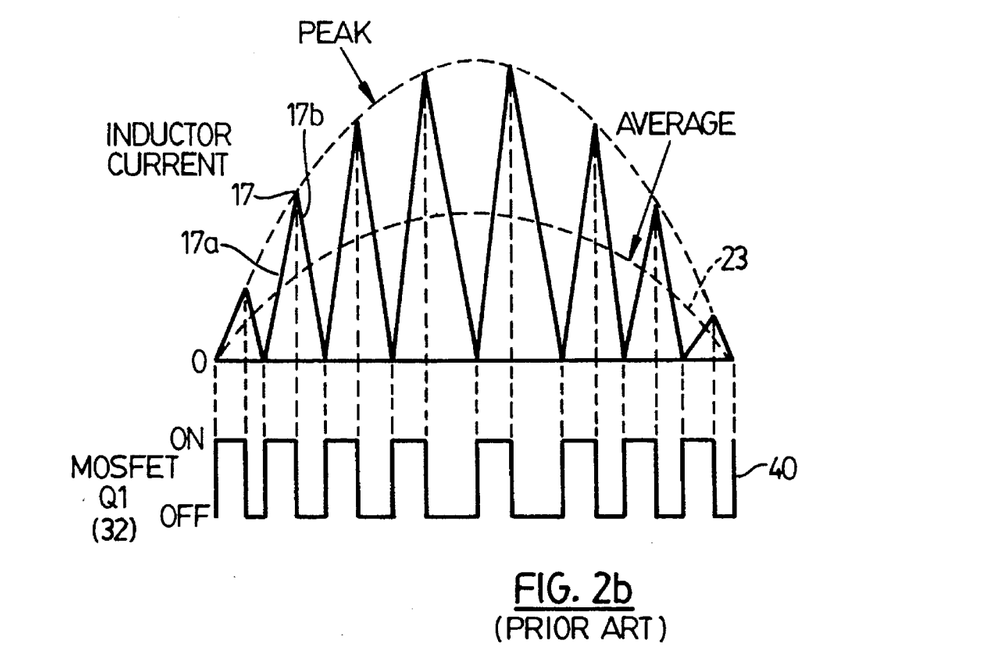
FIG. 2(b) shows in diagrammatic form voltage and current waveforms for the known power factor correction circuit of FIG. 1.

Reference is again made to FIG. 2(b) which shows the inductor or charging current 17 which is produced by the power factor correction circuit 10 as shown in FIG. 1. When the power switch 32 is ON, i.e. the PWM signal 40 is high, the inductor 30 is charged as indicated by inductor current 17a. Conversely, when the power switch 32 is OFF, i.e. the PWM signal 40 is low, the inductor 30 discharges through the diode 34 (current 17b) thereby charging the capacitor 24. By using the switch 32 to control the charging and discharging of the inductor 30, the shape of the inductor current 17 can be controlled. As shown in FIG. 2(b), the inductor current 17 has an average value 23 which is sinusoidal in shape and as described above leads to high power factor.

It will be appreciated that the PFC circuit 10 according to the prior art has three primary shortcomings. First, there is a direct path between the rectified AC signal 14' and the load 28 when the switch 32 is open. Secondly, whenever the voltage on the capacitor 24 is less than the rectified AC signal 14', the capacitor 24 will charge. This means that the capacitor 24 must have the capacity to handle the rectified AC voltage 14' which is typically a high voltage. Thirdly, the high capacity required for the capacitor 24 means that an electrolytic capacitor must be used which can in turn affect the reliability and size of the PFC circuit 10.

Figure 3:
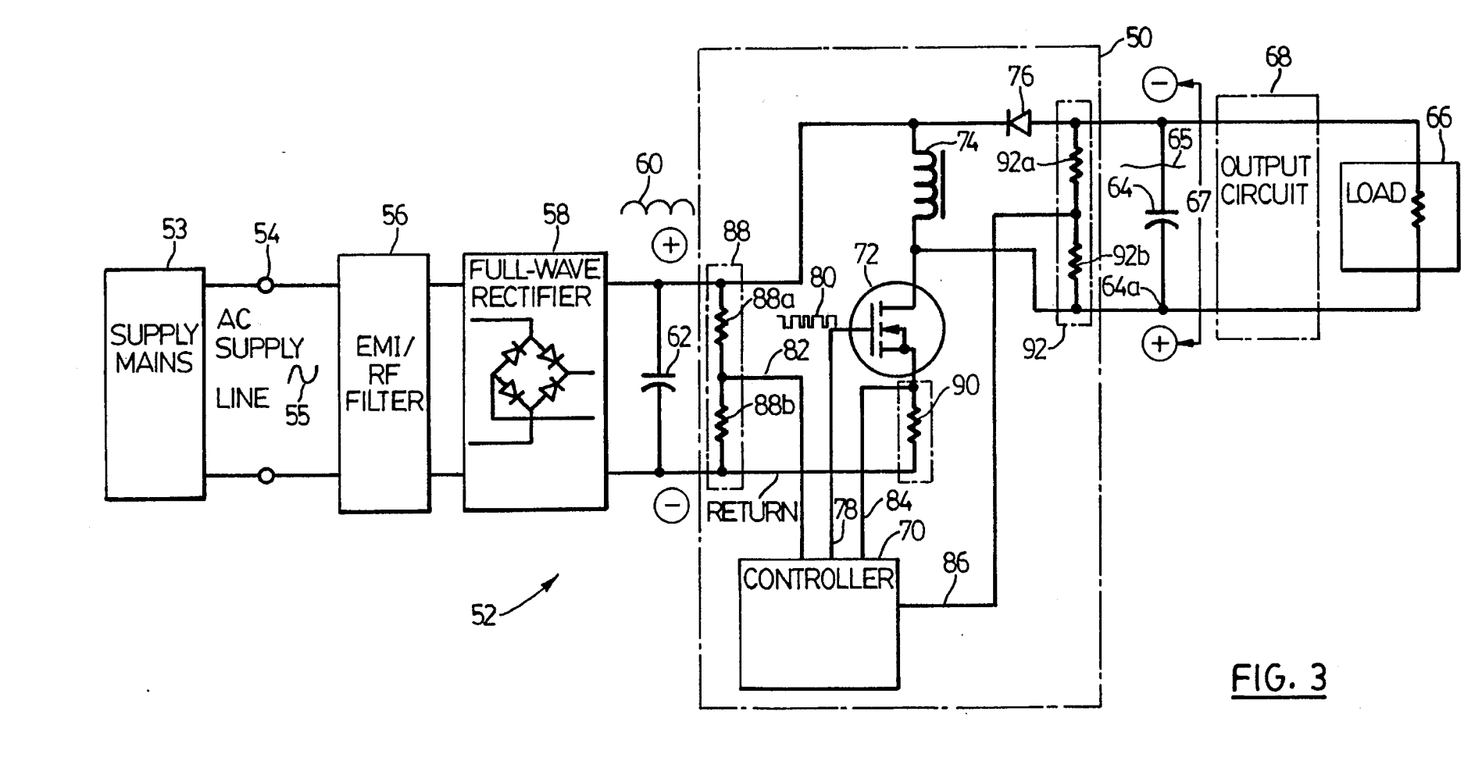
FIG. 3 shows in diagrammatic form a power factor correction circuit according to the present invention.

Reference is next made to FIG. 3 which shows a power factor correction (PFC) circuit 50 and power supply circuit 52 according to the present invention. The power supply circuit 52 comprises an input port 54, an EMI/RF filter stage 56, a full-wave rectifier 58 and the power factor correction circuit 50. The input port 54 provides the input for an AC supply signal 55 which is supplied by AC supply mains 53. The EMI/RF filter stage 56 serves to isolate the power supply 52 from high frequency noise, e.g. electromagnetic interference, which can appear on the AC supply signal 55 and the supply mains 53. The full-wave rectifier 58 comprises a known circuit configuration which can be formed from four diodes. The function of the rectifier stage 58 is to rectify the AC supply signal 55 to produce a rectified AC signal 60 comprising a series of positives pulses as shown in FIG. 3. The output of the rectifier 58 is connected to a capacitor 62 which produces a DC offset to raise the zero crossing voltage thereby preventing the rectified AC voltage 60 from going below zero. The capacitor 62 can comprise a film capacitor and capacitance value as will be within the knowledge of one skilled in the art. The power supply 52 also includes an output capacitor 64 which is coupled to the PFC circuit 50. As will be described below, a feature of the invention is that the output capacitor 64 can have a much lower value (and smaller size) than the bulk capacitor 24 in known PFC circuits such as the circuit 10 shown in FIG. 1.

As shown in FIG. 3, a load 66 can directly connect to the capacitor 64. The power supply 52 can also include an output circuit 68 (shown in broken outline) which is coupled between the capacitor 64 and the load 66. The output circuit 68 can comprise an inverter or a high frequency driver or other known circuit elements as will be within the understanding of one skilled in the art.

As shown in FIG. 3, the PFC circuit 50 according to the invention comprises a controller 70, a controllable switch 72, an inductor 74 and a uni-directional switch or diode 76. The first terminal of the inductor 74 provides the input to the PFC circuit 50 and is connected to the output of the full-wave rectifier 58 and also to one terminal of the capacitor 62. The first terminal of the inductor 74 is also connected to the cathode of the diode 76. The anode of the diode 76 is connected to the first terminal of the output capacitor 64 and also to the load 66. The other terminal of the inductor 74 is connected to the input of the switch 72 and also to the second terminal of the output capacitor 64. As shown in FIG. 3, one of the features of the PFC 50 according to the present invention is that the diode 76 is connected so that it provides a "blocking" function by having a polarity which is opposite to known PFC circuits 10 such as shown in FIG. 1. This leads to a number of advantages as will be described below.

Referring still to FIG. 3, the switch 72 can be implemented using, for example, a MOSFET transistor having a "gate" which is connected to a control output 78 on the controller 70 and a "source" connected to the second terminal of the inductor 74. The MOSFET switch 72 also has a "drain" terminal and the connection of the drain is described below. The controller 70 controls the state of the MOSFET switch 72 through the gate by generating a pulse width modulated (PWM) signal 80 on the control output 78. The controller 70 can be implemented using known PFC devices, such as the Motorola MC34262 as will be within the understanding of one skilled in the art, and the specification sheets for the MC34262 and MC33262 Family of Power Factor Controllers are incorporated herein by this reference.

As shown in FIG. 3, the controller 70 also includes three sensing inputs denoted by references 82,84,86, respectively. The first sensing input 82 is coupled to a voltage divider 88 which is formed from two resistors 88a,88b that are connected across the capacitor 62. The controller 70 uses the voltage divider 88 to monitor the voltage on the capacitor 62 which also corresponds to the input voltage level (i.e. rectified AC signal 60) for the PFC circuit 50. The second sensing input 84 is coupled to a resistor 90 which is connected between the drain of the MOSFET switch 72 and RETURN or NEGATIVE terminal for the supply mains 53. The controller 70 can determine the current flowing in the switch 72 by reading the voltage drop across the resistor 90. The third sensor input 86 is coupled to another voltage divider 92 which is formed from two resistors 92a,92b and connected across the output capacitor 64. The controller 70 uses the voltage divider 92 to monitor the voltage across the output capacitor 64, i.e. the DC output voltage 65.

In operation, when the controller 78 closes the MOSFET switch 72 (using the control output 78 connected to the gate of the MOSFET), the circuit loop is completed and the rectified AC voltage 60 will induce a current to flow causing energy to be stored in the inductor 74. When the controller 78 opens the switch 72, the circuit loop is opened. The inductor 74 appears as a high impedance to the rectified AC signal 60 and the energy stored in the inductor 74 will discharge into the capacitor 64. Because of its polarity, the diode 76 blocks the flow of positive current through it and instead the energy stored in the inductor 74 will discharge into the second terminal 64a of the capacitor 64 thereby charging the second terminal positively with respect to the first terminal. Due to the operation of the diode 76, the polarity of the output voltage (indicated by reference 67) is reversed from the polarity of the AC supply signal 55. The polarity of the output voltage 67 seen by the load 66 can be changed by including an inverter (not shown) in the output circuit 68.

A feature of the PFC circuit 50 shown in FIG. 3 is the elimination of a direct charge path (or "off-state" current) through the diode 76 when the switch 72 is open (i.e. OFF). When the MOSFET switch 72 is open, there is no return path for the rectified AC signal 60 and the diode 76 blocks the rectified AC signal 60 from the load 66. The advantages of this feature are first, isolation of the load 66 from the rectified AC signal 60. Because the rectified AC signal 60 is typically a high voltage signal, e.g. 120, 220, 240, 277 or 347 Volts AC or VAC, isolation of the load 66 is desirable for safety reasons. The resultant isolation also eliminates the need for elaborate protection circuitry as necessary in prior art devices. Secondly, eliminating the off-state current means that the size of the capacitor 64 for the circuit 52 shown in FIG. 3 is smaller because when the switch 72 is open, the capacitor 64 will not charge to the level of the rectified AC voltage 60 (due to the blocking action of the diode 76). Unlike prior art devices (e.g. FIG. 1), the capacitor 64 in FIG. 3 does not need to handle a voltage, $V_{CAP} \geq 1.2 \sqrt{2} V_{IN}$. In practical terms, this means that the power supply 52 and PFC 50 shown in FIG. 3 can be compact and smaller in size than found in a conventional PFC circuit 12 shown in FIG. 1, and therefore the PFC circuit 50 according to the invention can have wider application. As will be described below, the size of the output capacitor 64 can be further reduced for other topologies according to the present invention leading to further advantages in terms of size and performance.

Figure 4:
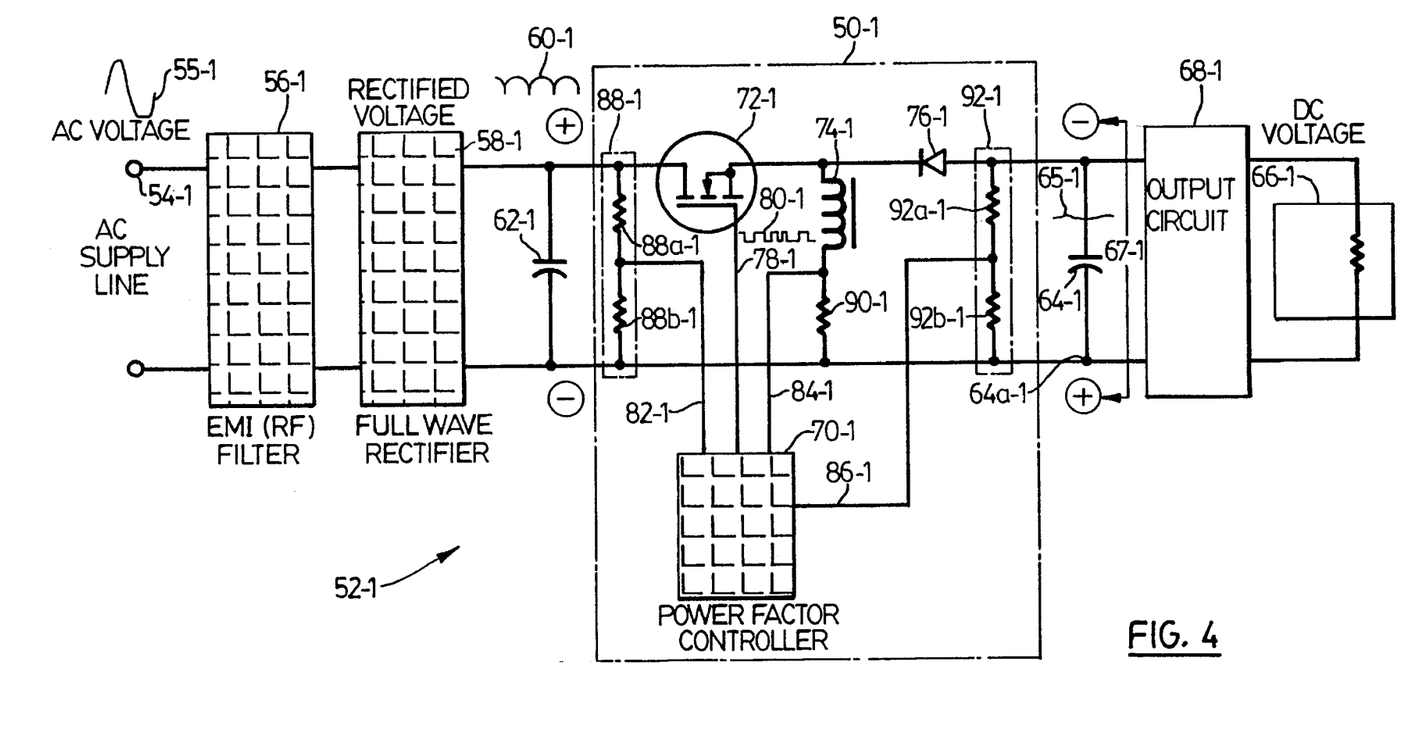
FIG. 4 shows in diagrammatic form a second embodiment of the power factor correction circuit according to the present invention.

Reference is next made to FIG. 4 which shows another embodiment of a power factor correction circuit 50-1 and power supply circuit 52-1 according to the present invention. As shown in FIG. 4, the power supply circuit 50-1 comprises an input port 54-1 (for receiving an AC voltage signal 55-1 from the supply mains 53 (not shown)), an EMI/RF filter stage 56-1, a full-wave rectifier 58-1 and the PFC 50-1. The power supply circuit 52-1 shown in FIG. 4 includes an output circuit 68-1 which can comprise known circuits, for example, an inverter or high frequency converter. The output circuit 68-1 is coupled between an output capacitor 64-1 and load 66-1 as shown.

The PFC 50-1 shown in FIG. 4 comprises a controller 70-1, a switch 72-1, an inductor 74-1 and a diode 76-1. The controller 70-1 has a control output 78-1 which is connected to the control input of the switch 72-1. As described above for FIG. 3, the controller 70-1 uses the output 78-1 to control the state (i.e. OPEN or CLOSED) of the switch 72-1 by generating a pulse width modulated signal 80-1. The switch 72-1 can be implemented as a MOSFET. It is a feature of the PFC 50-1 shown in FIG. 4 that the MOSFET switch 72-1 can be either a P-type or an N-type. As shown in FIG. 4, the source of the MOSFET switch 72-1 is connected to the output of the full-wave rectifier 58-1 and receives rectified AC voltage 60-1. The source of the MOSFET switch 72-1 is also connected to the voltage divider 88-1 formed from resistors 88a-1,88b-1. The controller 70-1 uses input 82-1 to sense the voltage level generated by the divider 88-1 which corresponds to the voltage level of the rectified AC signal 60-1. The drain of the MOSFET switch 72-1 is connected to one terminal of the inductor 74-1 and also to the cathode of the diode 76-1. The anode of the diode 76-1 is connected to one terminal of the output capacitor 64-1 and the voltage divider 92-1. The other terminal of the capacitor 64-1 is connected to the inductor 74-1 through the resistor 90-1.

In operation, when the switch 72-1 is closed by the controller 70-1 (through output line 78-1 and control signal 80-1), the rectified AC voltage 60-1 will cause a current to flow in the inductor 74-1. Because the inductor 74-1 appears as a high impedance to the rectified AC signal 60-1, energy will be stored in the inductor 74-1. When the controller 70-1 opens the switch 72-1, the energy stored in the inductor 74-1 will discharge. Due to the polarity of the diode 76-1, the energy stored in the inductor 74-1 will charge the second terminal 64a-1 of the capacitor 64-1 through the resistor 90-1. As shown in FIG. 4, this produces an output voltage polarity 67-1 which is opposite to that of the input AC signal 55-1. As described above, the polarity of the DC output signal 65-1 seen by the load 66-1 can be changed by the output circuit 68-1 which is coupled between the load 66-1 and the output capacitor 64-1.

Referring still to FIG. 4, the controller 70-1 includes an input 84-1 for sensing the current flowing in the inductor 74-1 by measuring the voltage drop across the resistor 90-1. The controller 70-1 also includes an input 86-1 for sensing the output voltage level 65-1, i.e. the voltage on the output capacitor 64-1. The input 86-1 is connected to the voltage divider 92-1 which formed from two resistors 92a-1,92b-1 and is coupled across the output capacitor 64-1. The voltage levels sensed on inputs 82-1,86-1 are used by the controller 70-1 as will be understood by one skilled in the art of active power factor correction and familiar with, for example, the MOTOROLA MC34262 Family of Power Factor Controllers as described in the specification sheets.

The PFC circuit 50-1 shown in FIG. 4 provides the same features as the PFC circuit 50 of FIG. 3, for example, the absence of a direct charge path when the switch 72-1 is open (or closed), a lower capacitance value for the output capacitor 64-1, etc. In addition, the PFC circuit 50-1 of FIG. 4 can utilize either a P-type or N-type MOSFET device for the switch 72-1.

Figure 5:
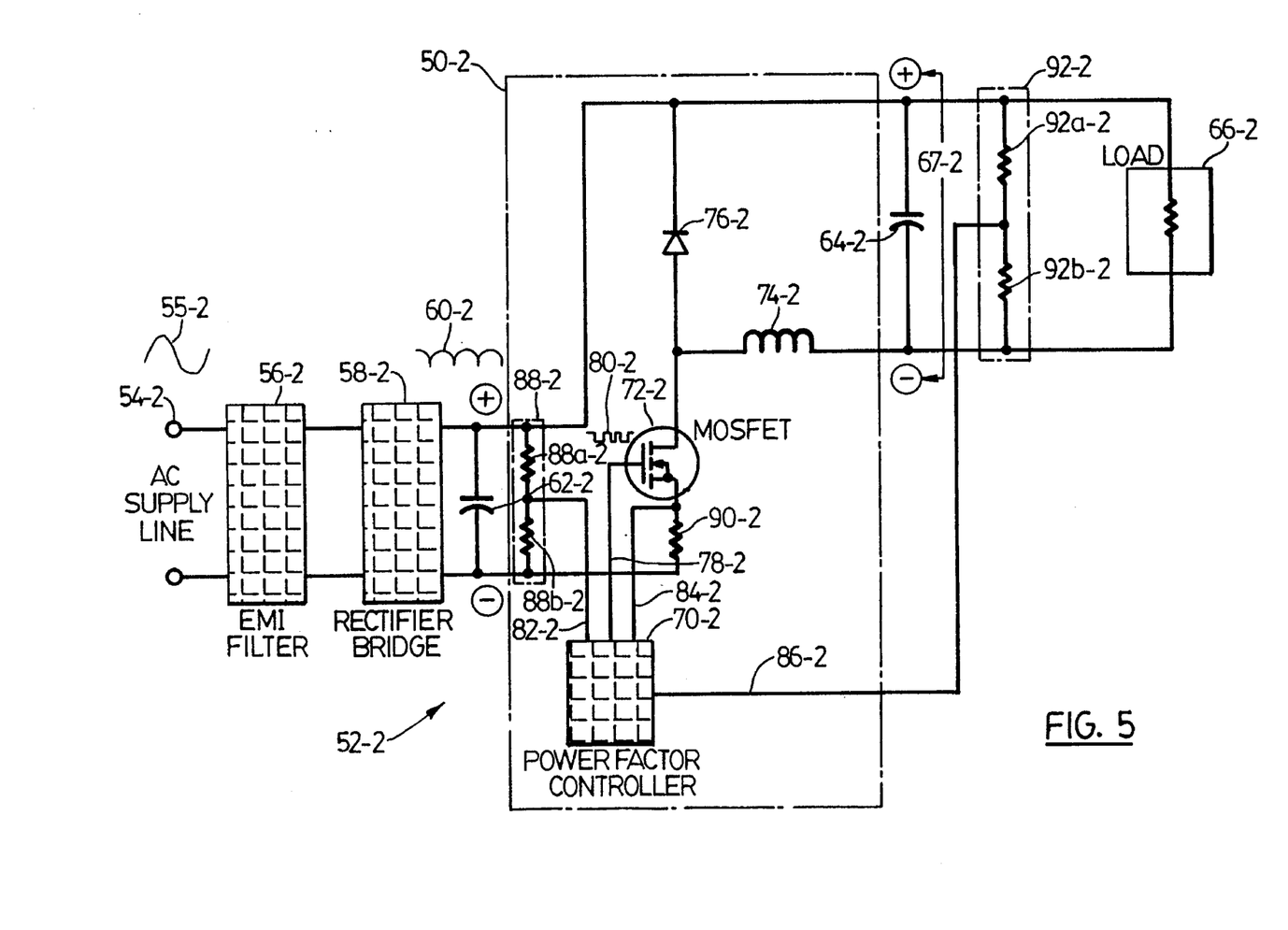
FIG. 5 shows in diagrammatic form a third embodiment of the power factor correction circuit according to the present invention.

Reference is next made to FIG. 5 which shows a PFC circuit 50-2 according to another embodiment of the present invention. The PFC circuit 50-2 is part of a power supply circuit 52-2.

As shown in FIG. 5, the power supply circuit 50-2 comprises an input port 54-2, an EMI/RF filter stage 56-2, a full-wave rectifier stage 58-2, and a zero-crossing capacitor 62-2 which are connected and function as described above. The PFC circuit 50-2 comprises a controller 70-2, a switch 72-2, a diode 76-2 and an inductor 74-2. The switch 72-2 can comprise a MOSFET having a source connected to a node formed by the anode of the diode 76-2 and one terminal of the inductor 74-2. The drain of the MOSFET switch 72-2 is connected to the RETURN terminal through the resistor 90-2. The controller 70-2 can determine the amount of current flowing through the switch 72-2 by using input 84-2 to sense the voltage drop across the resistor 90-2. The cathode of the diode 76-2 forms the input to the PFC circuit 50-2 and is connected directly to the positive terminal 64b-2 of output capacitor 64-2 and also to the output of the rectifier stage 58-2. The negative terminal 64a-2 of the output capacitor 64-2 is connected to the node formed by the other terminal of the inductor 74-2 and the load 66-2. The PFC 50-2 also includes voltage dividers 88-2,92-2 to sense the input and output voltage levels respectively as described above.

A feature of the PFC 50-2 topology shown in FIG. 5 is an output voltage polarity 67-2 which is the same as the polarity of the rectified AC signal 60-2. Another feature of topology shown in FIG. 5 is the series connection of the inductor 74-2 and the load 66-2. Because the inductor 74-2 switch is in series with the load 66-2, the load 66-2 will act as a damper, which means that the voltage on the capacitor 64-2 will typically be less than the voltage level of the rectified AC signal 60-2 (and input signal 55-2). This allows the size of the output capacitor 64-2 to be reduced resulting in advantages for the power supply 52-2 as have already been described for the circuits depicted in FIGS. 3 and 4. Unlike the PFC circuits 50,50-1 described above, the PFC circuit 50-2 shown in FIG. 5 will have a charge path to the load when the switch 72-2 is open. This is however is desirable for some applications, e.g. a power supply for a low-voltage fluorescent lamp or a low voltage analog power supply.

Figure 6:
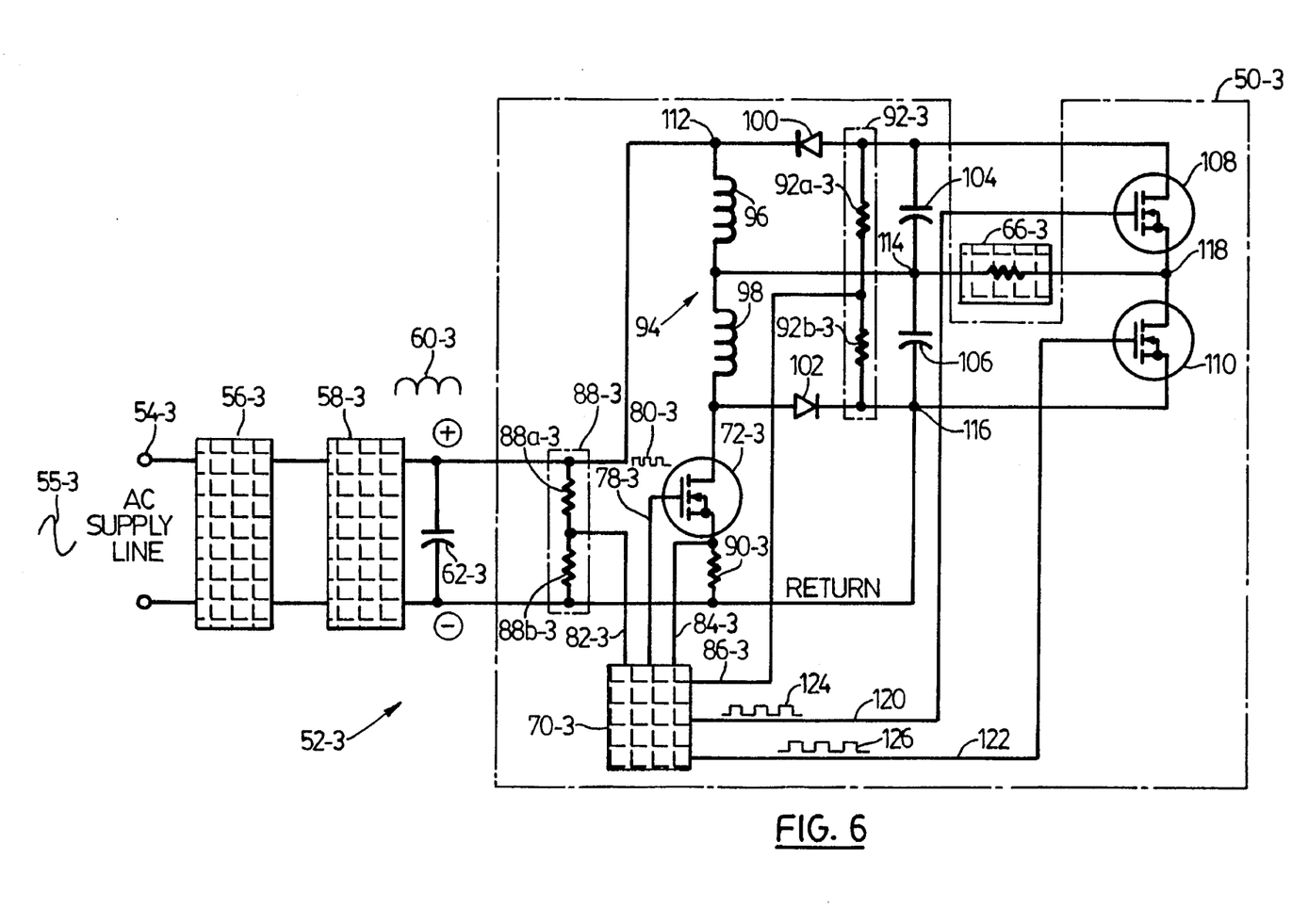
FIG. 6 shows in diagrammatic form a fourth embodiment of the power factor correction circuit according to the present invention.

Reference is next made to FIG. 6 which shows a PFC circuit 50-3 according to another embodiment of the present invention. The PFC circuit 50-3 shown in FIG. 6 is also integrated with a power supply circuit 52-3. The power supply circuit 52-3 comprises an input port 54-3, an EMI/RF filter stage 56-3 and a full-wave rectifier stage 58-3. The input port 54-3 is coupled to the supply mains (not shown) and receives an AC voltage signal 55-3 which is filtered by the EMI/RF stage 56-3 and then rectified by the full-wave rectifier stage 58-2 to produce a rectified AC signal 60-3 as will readily understood by one skilled in the art. As shown, the power supply circuit 52-3 includes a capacitor 62-3 which is coupled to the output of the rectifier 58. The function of the capacitor 62-3 is to raise the level of the rectified AC signal 60-3 to prevent it from crossing zero.

Referring still to FIG. 6, the PFC circuit 50-3 comprises a controller 70-3, a switch 72-3, and an output network indicated generally by reference 94. The output network 94 under the control of the controller 70-3 produces an output voltage to drive the load 66-3. As will be described, a feature of the network 94 (and PFC 50-3) is the elimination of the need for a bulky electrolytic output capacitor 24 (as in the PFC circuit 10 shown in FIG. 1). Another feature of the PFC 50-3 shown in FIG. 6 is the capability to provide the same performance characteristics as the prior art devices (FIG. 1) but in a smaller and compact topology which makes the power supply 52-3 according to the invention suitable for application in small line-powered electronic devices such as notebook or portable personal computers.

As shown in FIG. 6, the output network 94 for the PFC 50-3 comprises first and second inductors 96,98, first and second diodes 100,102, first and second output capacitors 104,106, and first and second output switches 108,110. The switch 72-3 and output switches 108,110 can be implemented using MOSFET devices as shown in FIG. 6. One terminal of the inductor 96 is connected to the cathode of the diode 100 at node 112 which is also connected to the output of the rectifier stage 58-3 and provides the input for the rectified AC signal 60-3. The other terminal of the inductor 96 is connected to the second inductor 98 to form a node 114 which also provides an output terminal for connecting to the load 66-3. The other terminal of the second inductor 198 is connected to the source of the switch 72-3 (implemented as a MOSFET) and to the anode of the second diode 102. The cathode of the second diode 102 is connected to one terminal of the output capacitor 106 and the drain terminal of the second output switch 110. This connection forms a node 116 which is also connected to the RETURN terminal as shown. The source of the second output switch 110 is connected to the drain of the first output switch 108 and this connection forms a node 118 which provides the other output terminal for connecting the load 66-3. As shown in FIG. 6, the source of the first switch 108 is connected to the anode of the first diode 100 and to one terminal of the first output capacitor 104. The other terminal of the first output capacitor 104 is connected to the node 114 or output terminal. The second output capacitor 106 is also connected to the output terminal 114 as shown in FIG. 6. The output capacitors 104,106 are selected to be symmetrical and can have values in the nano-Farad range which represents a significant improvement over prior art devices as shown in FIG. 1.

As shown in FIG. 6, the PFC circuit 50-3 includes a voltage divider 88-3 which is coupled across the compensation capacitor 62-3 (i.e. input to the PFC 50-3). The voltage divider 88-3 is formed from two resistors 88a-3, 88b-3 and used by the controller 70-3 to determine the input voltage level by sensing the voltage level on input line 82-3. Similarly, the PFC 50-3 includes another voltage divider 92-3 which is connected across the two output capacitors 104,106. The voltage divider 92-3 is formed from two resistors 92a-3,92b-3. The controller 70-3 determines the output voltage level by sensing the voltage level in the divider 92-3 on input line 86-3. The controller 70-3 includes another input line 84-3 which is connected to the output, i.e. drain, of the switch 72-3 and a resistor 90-3 which is connected to the RETURN terminal. The controller 70-3 also includes an output control line 78-3 which is connected to the control input of the switch 72-3, e.g. gate if the switch 72-3 is implemented as a MOSFET device. As shown in FIG. 6, the controller 70-3 includes two additional control outputs 120,122. The first control output 120 is connected to the control input of the first output switch 108. (If the output switch 108 is implemented as a MOSFET device, the control input comprises the gate.) Similarly, the second control output 122 is connected to the control input of the second output switch 110.

In operation when the controller 70-3 closes the switch 72-3, the rectified AC voltage 60-3 at node 112 will cause a current to flow. Because the inductors 96,98 appear as a high impedance to the AC signal 60-3, energy will be stored in each of the inductors 96,98. When the controller 70-3 opens the switch 72-3 using the control output 78-3 the energy stored in the inductors 96,98 will charge the output capacitors 104,106 to produce a DC voltage output signal to drive the load 66-3 connected across the output terminals 114,118. When the switch 72-3 is opened, the energy stored in the inductor 98 discharges through the diode 102 to charge the output capacitor 106, and the energy stored in the first inductor 96 charges the other output capacitor 104. When the switch 72-3 is open, the diodes 100,102 isolate the two output capacitors 104,106 from the rectified AC voltage 60-3 thereby eliminating the off-state current or direct charge path to the load 66-3. The charge stored by the output capacitors 104,106 drives the load 66-3 through the operation of the output switches 108,110 which form a "half-bridge" configuration. According to the invention, the output switches 108,110 are alternately switched on and off using control signals 124,126 on outputs 120,122, respectively, from the controller 70-3. When the first output switch 108 is turned on (and the second switch 110 turned off), the charge (i.e. DC voltage) stored in the first output capacitor 104 drives the load 66-3. Similarly, when the second output switch 110 is turned on, the charge (i.e. DC voltage) stored in the second output capacitor 106 will drive the load 66-3.

In another aspect, the PFC circuit 50-3 shown in FIG. 6 can be operated by driving the switch 72-3 with a control signal 80-3 having a frequency which is approximately ten times the frequency at which the output switches 108,110 are turned on and off, i.e. by signals 124,126. The controller 70-3 can drive the output switches 108,110 with respective square waves 124,126 each having, for example, a 50% duty cycle and a frequency proportional to the control signal 80-3. This produces an effect wherein one output capacitor, e.g. capacitor 106, is being charged by the energy stored in the inductor 98, while the other output capacitor, e.g. capacitor 104, is driving, i.e. discharging through, the load 66-3. A feature of this aspect of the PFC circuit 50-3 is that the output capacitors 104,106 can be quite small in value, for example, in the 200 nano-Farad range with the exact chosen value depending on the parameters of the circuit or application. It will be appreciated that this allows the normally large bulk capacitor 24 (FIG. 1) to be replaced by two small capacitors 104,106 which need not be electrolytic, thereby also providing improved reliability for the power supply circuit 52-3.

Another feature of the output network 94 for the PFC circuit 50-3 shown in FIG. 6 is the high voltage output which is attainable. This feature is useful for power supplies running high intensity discharge lamps, for example, metal halide or mercury vapour lamps, which require a high initial voltage, e.g. 600 Volts, to start the gas discharge in the lamp, followed by a low transient voltage, e.g. 20 Volts and then a running voltage in the range 70 to 120 Volts, to maintain the gas discharge. Through the control of the switch 72-3 and the output switches 108,110, the two output capacitors 104,106 can be operated as a voltage doubler. To produce a high start voltage, e.g. 600 Volts as required by a high intensity discharge lamp, the voltage levels on the output capacitors 104,106 can be progressively increased or boosted by repeatedly opening and closing the switch 72-3 (while keeping the output switches 108,110 open). Once the output capacitors 104,106 are charged to the desired start voltage level, e.g. 600 Volts, the output switches 108,110 are activated to drive the load 66-3. (The output voltage level is monitored by the controller 70-3 through the voltage divider 92-3 and input line 86-3.) Because the output voltage level is produced by the two output capacitors 104,106 in combination, each output capacitor 104,106 can have a smaller value thereby maintaining the compact topology for the PFC 50-3 (and power supply circuit 52-3) without compromising performance. Once the high level start voltage is generated and put through the load 66-3, e.g. mercury lamp, a low level run voltage can be maintained by operating the switch 72-3 at a frequency which only allows the output capacitors 104,106 to charge to a low level, e.g. 70 to 120 Volts.

The controller 70-3 is similar to the controller 70 described above and produces power factor correction by providing a sinusoidal shape to the output current which is substantially in phase with the sinusoidal AC input signal 55-3. The controller 70-3 according to the invention also provides additional functions for controlling the output switches 108,110 as described above. Implementation of the controller 70-3 is within the understanding of one familiar with digital logic design and prior art PFC controllers such as the Motorola MC34262 family of devices.

Figure 7:
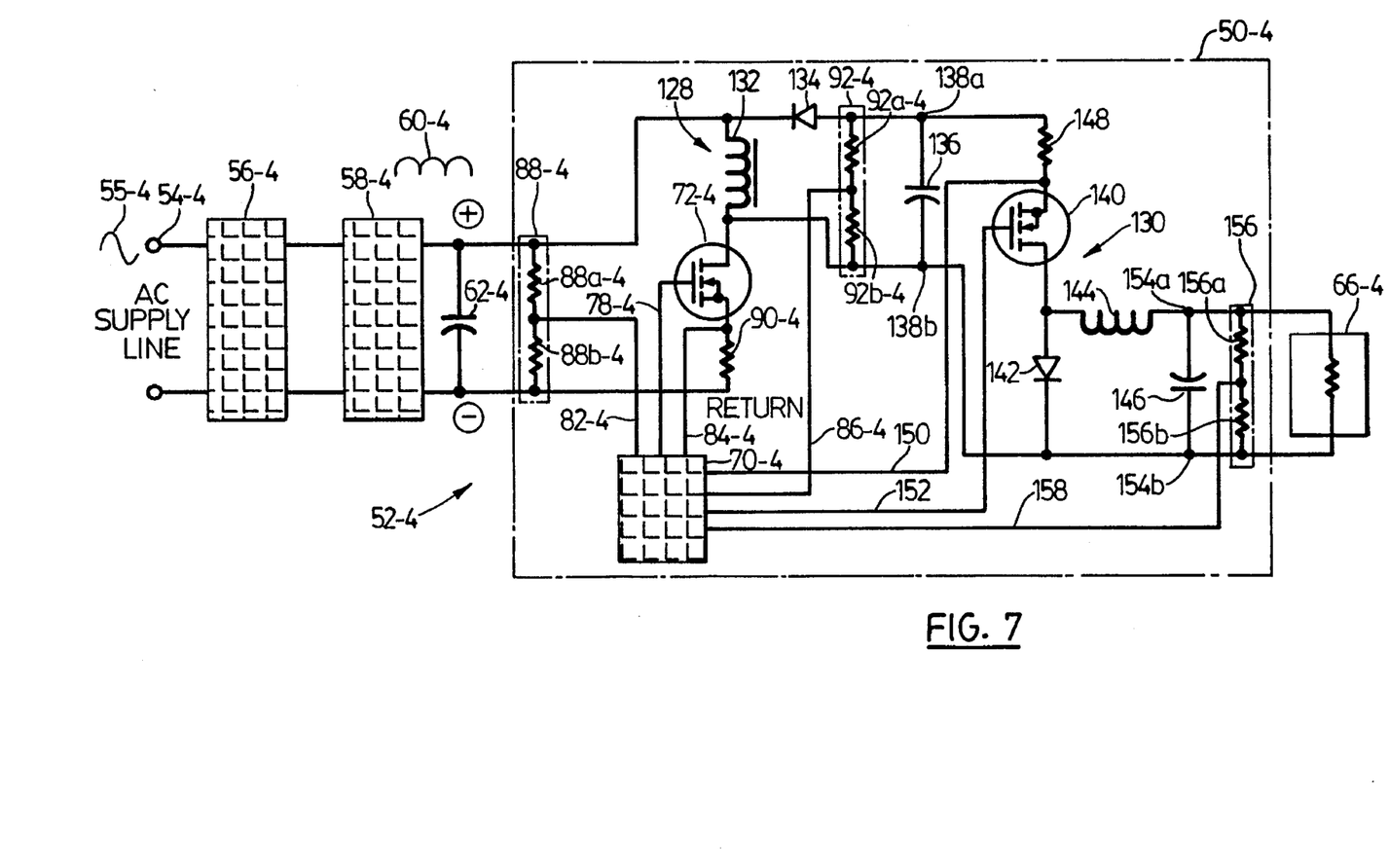
FIG. 7 shows in diagrammatic form a fifth embodiment of the power factor correction circuit according to the present invention.

Reference is next made to FIG. 7 which shows another embodiment of a PFC circuit 50-4 according to the present invention. The PFC circuit 50-4 is integrated with a power supply circuit 52-4. The power supply circuit 52-4 comprises an input port 54-4 which receives an AC supply signal 55-4 from the supply mains (not shown). The input port 54-4 is coupled to an EMI/RF filter stage 56-4 which is coupled to a full-wave rectifier stage 58-4. The full-wave rectifier 58-4 produces a rectified AC signal 60-4. The power supply circuit 52-4 includes a capacitor 62-4 across the output of the rectifier 58-4 for raising the level of the rectified AC signal 60-4 above zero. The PFC circuit 50-4 is coupled to the output of the rectifier stage 58-4 and receives the rectified AC signal 60-4.

As shown in FIG. 7, the PFC circuit 50-4 comprises a controller 70-4, a switch 72-4, a boost stage 128 and a reducer stage 130. The function of the boost stage 128 is to "boost" or raise the level of the voltage signal generated from the rectified AC signal 60-4, and the function of the reducer stage 130 is to apply the "boosted" voltage level to the load 66-4 and/or maintain a reduced output voltage level derived from the "boosted" voltage level. As shown in FIG. 7, the switch 72-4 can be implemented using a MOSFET device having a gate connected to a control output 78-4 on the controller 70-4. The drain of the MOSFET switch 72-4 is coupled to the RETURN or NEGATIVE terminal through a resistor 90-4. The drain of the switch 72-4 is also connected to an input 84-4 on the controller 70-4 which uses the voltage drop across the resistor 90-4 to determine the current flowing through the switch 72-4. There is a voltage divider 88-4 coupled across the capacitor 62-4, i.e. input to the PFC circuit 50-4. The voltage divider 88-4 is formed from two resistors 88a-4,88b-4 which are connected to an input 82-4 on the controller 70-4. The controller 70-4 uses the voltage divider 88-4 to determine the level of the input voltage to the PFC 50-4, i.e. rectified AC signal 60-4.

Referring still to FIG. 7, the boost stage 128 comprises an inductor 132, a diode 134, and a capacitor 136. The inductor 132 provides the input to the boost stage 128 for receiving the rectified AC signal 60-4. One terminal of the inductor 132 is connected to the output of the rectifier 58-4 and the cathode of the diode 134. The anode of the diode 134 is connected to one terminal of the capacitor 136 and this connection forms an output terminal 138a for the boost stage 128. The other terminal of the capacitor 136 is connected to the second terminal of the inductor 132. The second terminal of the inductor 132 is also connected to the switch 72-4 (the source if the switch 72-4 is implemented using a MOSFET device). This connection forms the other output terminal 138b for the boost stage 128. As shown in FIG. 7, a voltage divider 92-4 is coupled across the output terminals 138a, 138b. The voltage divider 92-4 is formed from two resistors 92a-4,92b-4 which are coupled to an input line 86-4 on the controller 70-4. The controller 70-4 uses the input line 86-4 to read the voltage developed by the boost stage 128 across its outputs 138a,138b (i.e. capacitor 136).

As shown in FIG. 7, the reducer stage 130 is coupled to the output terminals 138a,138b of the boost stage 128 and receives the charge (or voltage) from the capacitor 136. The reducer stage 130 comprises a switch 140, a diode 142, an inductor 144 and an output capacitor 146. The switch 140 can be implemented using a MOSFET device. The source of the MOSFET switch 140 is coupled to the output terminal 138a of the boost stage 128 through a resistor 148. The resistor 48 protects the switch 140 by limiting the current and also allows the controller 70-4 to measure the current by sensing the voltage drop across the resistor 148 using an input 150. The gate of the switch 140 is connected to a second control output 152 on the controller 70-4. The controller 70-4 uses the switch 140 to control the supply of the "boosted" voltage from the boost stage 128 to the reducer stage 130. Another feature of the PFC 50-4 is the ability to control the current through the reducer stage 130 by the operation of the switch 140 and the "series-connected" inductor 144.

Referring still to FIG. 7, the output, i.e. drain, of the switch 140 is connected to the anode of the diode 142 and one terminal of the inductor 144. The cathode of the diode 142 is connected to the other output terminal 138b of the boost stage 128. The other terminal of the inductor 144 is connected to one terminal of the output capacitor 146 and this connection forms an output terminal 154a for the PFC 50-4 (and power supply 52-4). The other terminal of the capacitor 146 is connected to the output terminal 138b of the boost stage 128 and this connection forms the other output terminal 154b for the circuit 52-4. As shown in FIG. 7, the load 66-4 is connected to the output terminals 154a,154b. A voltage divider 156 is connected across the output capacitor 146 and comprises two resistors 156a,156b. The resistors 156a,156b are connected to an input 158 on the controller 70-4.

In operation, the boost stage 128 is used to "boost" or "pump" the voltage level on the capacitor 136 to a higher level than the original rectified AC voltage 60-4. The reducer stage 130 is then used to feed and modulate/reduce the "boosted" voltage to the load 66-4. Referring to FIG. 7, the controller 70-4 pumps the voltage level on the capacitor 136 in the boost stage 128 by repeatedly opening and closing the switch 72-4. When the switch 72-4 is closed, the rectified AC voltage 60-4 will cause a current to flow and because the inductor 132 appears as a high impedance, energy will be stored in the inductor 132. When the switch 72-4 is subsequently opened by the controller 70-4, the energy stored in the inductor 132 will discharge into the capacitor 136. Provided the second switch 140 remains open, the voltage on the capacitor 136 will increase each time the first switch 72-4 is opened and energy is discharged from the inductor 132. The pumping of the voltage level on the capacitor 136 can be repeated until the desired voltage level is achieved. (The controller 70-4 can determine the current voltage level by using the input line 86-4 to sense the voltage across the divider 92-4.) It will be appreciated that the diode 134 blocks the charge path, i.e. rectified AC signal 60-4, to the capacitor 136 when the switch 72-4 is open. Once the capacitor 136 has been charged to the desired voltage level, the controller 70-4 closes the second switch 140. This causes the charge stored on the capacitor 136 to flow into the reducer stage 130. It will be appreciated that the controller 70-4 can also maintain a high power factor ratio by operating the switch 72-4 so that the current drawn by the capacitor 136 is sinusoidal.

Once the capacitor 136 is charged or boosted to the desired voltage level, the controller 70-4 operates the second switch 140 to drive the load 66-4. In addition, the controller 70-4 can control the output to the load 66-4 through the opening and closing of the switch 140. This allows the controller 70-4 to also "shape" the charging current to the output capacitor 146. Through control of the switch 140, the controller 70-4 can also "pump" the voltage level on the output capacitor 146 and/or control the charging current supplied to the capacitor 146. It will be appreciated that the maximum level for the output capacitor 146 is limited to the level of the first capacitor 136.

According to the invention, the values for the capacitors utilized for the PFC circuits shown in FIGS. 3 to 7 can be in the nano-Farad range, and the values for the inductors can be in the 100 micro-Henry to 1.5 milli-Henry range. The exact component values chosen will depend on overall performance or design specifications for the power supply and is within the understanding of those skilled in the art of power supply design.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. A power factor correction circuit for use with a power supply having an input port for receiving an AC signal and a rectifier for producing a rectified AC signal and an output stage for outputting a DC output signal for driving a load coupled to the output stage, said power factor correction circuit comprising:

(a) an input coupled to the rectifier for receiving the rectified AC signal;

(b) inductive means coupled to said input for storing energy in response to excitation by the rectified AC signal;

(c) controller means for controlling excitation of said inductive means;

(d) charge storage means coupled to said inductive means for charging by said inductive means under control of said controller means to produce the DC output signal; and (e) blocking means which blocks a direct path for current flow from said input to the load.

2. The power factor correction circuit as claimed in claim 1, wherein said blocking means comprises a reverse-connected diode having first and second terminals, said first terminal being connected to said input and said second terminal being connected to said charge storage means.

3. The power factor correction circuit as claimed in claim 1, wherein said controller means comprises a controller and a switch, said switch being coupled between said inductive means and a return terminal for the AC input signal, and said switch having a control input coupled to said controller and being operable in a conduction state and a non-conduction state.

4. The power factor correction circuit as claimed in claim 1 or 2, wherein said charging means comprises a non-electrolytic capacitor having a capacitance value in the nano-Farad range.

5. The power factor correction circuit as claimed in claim 1 or 2, wherein said inductive means comprises an inductor having one terminal coupled to said input and another terminal coupled to said charge storage means.

6. The power factor correction circuit as claimed in claim 1, further including output drive means coupled to said charge storage means and having means responsive to a control signal produced by said controller for alternately driving the load with the DC output signal.

7. The power factor correction circuit as claimed in claim 5, wherein said output drive means comprises first and second output switches coupled in a half-bridge configuration, each of said output switches having an input, an output and a control input, said control input of said first output switch being coupled to said controller for receiving a first control signal, and said control input of said second output switch being coupled to said controller for receiving a second control signal, and said charge storage means comprising first and second capacitors each having two terminals, one terminal of said first capacitor being connected to one terminal of said second capacitor and said connection forming a first output terminal for connection to the load, the other terminal of said first capacitor being connected to the input of said first output switch, and the other terminal of said second capacitor being coupled to the output of said second output switch, and the output of said first output switch being connected to the input of said second output switch and forming a second output terminal for connection to the load.

8. The power factor correction circuit as claimed in claim 7, wherein said blocking means comprises first and second diodes, each diode having first and second terminals, the first terminal of said first diode being connected to the input of said first output switch and the second terminal of said first diode being connected to said input, and the first terminal of said second diode being connected to said inductive means and the second terminal of said second diode being connected to the output of said second output switch.

9. The power factor correction circuit as claimed in claim 8, wherein said energy storage means comprises first and second inductors each having two terminals, one terminal of said first inductor being connected to said input port and the second terminal of said first diode, the other terminal of said first inductor being connected to one terminal of said second inductor and to said first output terminal, and the other terminal of said second inductor being connected to the first terminal of said second diode and to said controller means.

10. The power factor correction circuit as claimed in claim 9, wherein said controller means comprises a controller and a switch having an input, an output and a control input, the input of said switch being connected to the first terminal of said second diode and the output of said switch being coupled to the return terminal, and the control input of said switch being connected to said controller for receiving a control signal for operation in a conduction state and in a non-conduction state.

11. The power factor correction circuit as claimed in claim 8 or 9, wherein said first and second output terminals provide a neutral electrical connection between a positive output voltage rail and a negative output voltage rail, said positive output voltage rail corresponding to the voltage level at the first terminal of said first diode and said negative output voltage rail corresponding to the voltage level at the second terminal of said second diode.

12. A power factor correction circuit for use with a power supply having an input port for receiving an AC input signal and a rectifier for producing a rectified AC signal and an output stage for outputting a DC output signal for driving a load coupled to the output stage, said power factor correction circuit comprising:

(a) an input coupled to the rectifier for receiving the rectified AC signal;

(b) charge storage means having first and second terminals, the first terminal being connected to said input and said connection forming a first output terminal and said second terminal forming a second output terminal for connecting the load;

(c) inductive means for storing energy in response to excitation by the rectified AC signal, said inductive means having first and second terminals, the first terminal of said inductive means being connected to said second output terminal;

(d) means for isolating said inductive means from said input port, said means for isolating being connected to said input and to the second terminal of said inductive means; and (e) controller means coupled to the second terminal of said inductive means for controlling excitation of said inductive means by providing a controllable current path through the load for the rectified AC signal to excite said inductive means and the load providing means for damping the rectified AC signal fed to said inductive means.

13. The power factor correction circuit as claimed in claim 12, wherein said charge storage means comprises a capacitor having a capacitance in the nano-Farad range.

14. The power factor correction circuit as claimed in claim 13, wherein said inductive means comprises an inductor having first and second terminals, said first terminal being connected to said second output terminal and to said capacitor, and a second terminal being connected to said means for isolating and said controller means.

15. The power factor correction circuit as claimed in claim 14, wherein said means for isolating comprises a reverse-connected diode having a first terminal connected to the second terminal of said inductor and having a second terminal connected to said input and forming said first output terminal.

16. The power factor correction circuit as claimed in claim 15 wherein said controller means comprises a controller and a switch, said switch being coupled between the second terminal of said inductor and a return terminal for the AC input signal, and said switch having a control input coupled to said controller for receiving a control signal for operating in a conduction state and a non-conduction state.

17. The electronic power supply as claimed in claim 1, wherein said load comprises a lamp.

18. A power factor correction circuit for use with a power supply having a supply input port for receiving an AC input signal and a rectifier for producing a rectified AC signal and an output stage for outputting a DC output signal for driving a load coupled to the output stage, said power factor correction circuit comprising:

(a) an input coupled to the rectifier for receiving the rectified AC signal;

(b) a booster stage coupled to said input and having a booster output port and means for producing a boosted signal from the rectified AC signal at said booster output port, said booster stage further having means which blocks a direct path for current flow from said input to said booster output;

(c) a reducer stage coupled to said booster output port and having means for generating the DC output signal from said boosted signal;

(d) controller means coupled to said booster stage and to said reducer stage for controlling operation of said booster and reducer stages; and (e) said controller means including power factor correction means.

19. A power factor correction circuit for use with a power supply having an input port for receiving an AC signal and a rectifier for producing a rectified AC signal and an output stage for outputting a DC output signal for driving a load coupled to the output stage, said power factor correction circuit comprising:

(a) an input having first and second terminals coupled to the rectifier for receiving the rectified AC signal;

(b) inductive means for storing energy in response to excitation by the rectified AC signal, said inductive means being coupled through a first path to one of said terminals and through a second path to the other of said terminals;

(c) controller means for controlling excitation of said inductive means, said controller means comprising a controller and a switch, and said switch having a control input coupled to said controller, said switch being operable in a conduction state and a non-conduction state;

(d) said switch being coupled in one of said first and second paths between said inductive means and said input;

(e) charge storage means coupled to said inductive means for charging by said inductive means under control of said controller means to produce the DC output signal;

so that when said switch is operating in said non-conduction state, said one path is open.

20. The power factor correction circuit as claimed in claim 19, and including blocking means in the other of said first and second paths for blocking a direct path for current flow from said input to said load.

* * * * *